Patented June 5, 1951

2,555,950

UNITED STATES PATENT OFFICE 2,555,950

PREPARATION OF 2-METHOXY-1-ALKANOLS AND 2-METHOXY-1-ALKANALS

Joseph D. C. Wilson, II, Wilmington Manor, Del., assignor to E. I. du Pont de Nemours & Company, Wilmington, Del., a corporation of Delaware No Drawing. Application June 23, 1949, Serial No. 100,978

5 Claims. (Cl. 260—602)

This invention relates to methods for the preparation of dioxygenated hydrocarbon compounds and to certain new dioxygenated compounds. More particularly this invention relates to a new method for the preparation of alkoxy alkanols and alkoxy alkanals and to certain new alkoxy alkanals.

Although the methanolysis of ethylene oxide is fairly satisfactory for the production of methoxyethanol, the process is impractical for the manufacture of higher alkanols, since it is extremely difficult to achieve clean-cut separation of the individual isomers produced from the alcoholysis of higher 1,2-alkylene oxides. For this reason a new and improved process for their production and also for the production of the corresponding aldehydes would constitute a valuable addition to the chemical technology. Certain of the higher methoxyaldehydes have not heretofore been made by any known method.

It is an object of this invention to provide a new process for the preparation of alkoxy alkanols and alkoxy alkanals. A further object is to provide new methoxyalkanals. Other objects will appear hereinafter.

The objects of this invention are accomplished by the following process which comprises reacting a 1,1-dimethoxy ether of an n-alkane of from 2 to 3 carbon atoms with carbon monoxide and hydrogen as the sole reactants at a temperature of 125° to 300° C. under superatmospheric pressure of at least 100 atmospheres and in the presence of a cobalt hydrogenation catalyst as the sole catalytic agent. By means of this invention, 2-methoxy-1-alkanals and their primary reduction products, i. e., the 2-methoxy-1-alkanols, of four to five carbon atoms can be produced. The novel methoxyaldehydes produced by this invention have the general formula $RCH(OCH_3)CHO$ wherein R is an alkyl radical of 1 to 2 carbon atoms. The new compounds of this invention are 2-methoxy-1-propanal, and 2-methoxy-1-butanal.

In the practice of this invention, the 1,1-dimethoxy-n-alkane is charged into a suitable pressure-resistant reaction vessel with 5 to 20% of its weight of the selected cobalt hydrogenation catalyst, for example cobalt oxide or cobalt carbonyl. A mixture of hydrogen and carbon monoxide is then injected at ordinary temperature into the reaction vessel under high pressure after which the reactants are heated, preferably in the range of 150-250° C., under superatmospheric pressure, particularly pressures of 800-1500 atmospheres, until the reaction is completed, or until no further pressure drop takes place. Suitable pressures are maintained during the reaction with carbon monoxide, hydrogen, or with mixtures of these two gases. After completion of the reaction the vessel is cooled, excess gases are bled off, the contents are discharged, and the reaction products are isolated by distillation.

The invention is illustrated in greater detail in the following examples:

Example I

Into a silver-lined, high-pressure reaction vessel of 400 cc. capacity was charged 90 grams of 1,1-dimethoxyethane and 5 grams of reduced cobalt oxide catalyst. The vessel was closed and pressured to 200 atm. with hydrogen, then to 500 atm. with carbon monoxide and heated to 200° C. for four hours during which time the pressure was maintained between 850–950 atm. with carbon monoxide.

At the end of this time the vessel was cooled in dry ice-acetone bath and the excess gas was bled off. The content was discharged into a still and distilled isothermally at the temperature of boiling xylene. The final pressure was about 5 mm. Fractionation of the combined distillate through an efficient column yielded 3 grams of a water azeotrope boiling at 84–86° C. and 14 grams of a compound boiling at 128–129° C. The water azeotrope contained about 80% of 2-methoxy-1-propanal, boiling point 106–108° C. A 2,4-dinitrophenylhydrazone prepared from this aldehyde melted at 163–164° C. and analyzed as follows:

Anal. Calc'd. for $C_{10}H_{12}N_4O_5$: C, 44.80; H, 4.52; N, 20.9

Found: C, 44.95; H, 4.74; N, 21.08, 21.14.

By reacting 2,4-dinitrophenylhydrazine with 2-methoxy-1-propanal in the molal proportions of two of the hydrazine to one of the methoxyaldehyde, an osazone, insoluble in hot ethanol but soluble in nitromethane, is obtained which melts at 303–304° C. with decomposition.

Anal. Calc'd. for $C_{15}H_{12}N_8O_8$: C, 41.7; H, 2.80; N, 25.9

Found: C, 42.03; H, 3.07; N, 26.55.

The compound boiling at 128–129° C. was shown to be 2-methoxy-1-propanol. Its 3,5-dinitrobenzoate melting at 95–96° C. did not depress the melting point of the 3,5-dinitrobenzoate derived from a sample of 2-methoxy-1-propanol which was synthesized by reduction of ethyl alpha-methoxypropionate with lithium aluminum hydride ($LiAlH_4$).

Example II

Eighty-five (85) grams of 1,1-dimethoxyethane and 13 grams of cobalt carbonyl were processed with carbon monoxide and hydrogen at 150° C. for 9 hours in accordance with the procedure described in Example I. Distillation of the reaction product yielded 8 grams of 2-methoxy-1-propanol, boiling point 128–130° C. A 3,5-dinitrobenzoate of the reaction product had a melting point 94–94.5° C. A mixed melting point of this derivative with an authentic sample of the 3,5-dinitrobenzoate of 2-methoxy-1-propanol showed no depression.

*Example III*

1,1-dimethoxyethane (90 grams), methanol (95 grams) and 5 grams of reduced cobalt oxide catalyst were treated as described in Example I with carbon monoxide and hydrogen at 250° C. for 9 hours. Distillation of the reaction product gave as described in Example I a water azeotrope and 3.5 grams of 2-methoxy-1-propanol.

*Example IV*

One-hundred and four (104) grams of 1,1-dimethoxypropane, 95 grams of methanol and 5 grams of reduced cobalt oxide catalyst were treated with carbon monoxide and hydrogen at 200° for four hours in accordance with the procedure described in Example I. This process was repeated three times until a total of 416 grams of 1,1-dimethoxypropane had been treated. The distillation yielded 17.5 grams of 2-methoxy-1-butanal and 10.6 grams of 2-methoxy-1-butanol. The aldehyde boiled at 127–132° C. and possessed a refractive index of $n_D^{25}$ 1.4020–1.4027. A 2,4-dinitrophenylhydrazone prepared therefrom melted at 197–198° C.

Anal. Calc'd. for $C_{11}H_{14}N_4O_5$: C, 46.8; H, 5.00; N, 19.9.

Found: C, 46.87; 47.15; H, 5.22; 5.15; N, 19.92; 20.04.

The 2-methoxy-1-butanol boiled at 143–146° C. and possessed a refractive index of $n_D^{25}$ 1.4090–1.4101.

The compounds derived from the process of this invention have the general formula

$$R-CH(OCH_3)-X$$

wherein R is an alkyl radical of one to two carbon atoms and X is a group attached through carbon to the methoxyl-bearing carbon atom and consists of a carbon-oxygen linkage in which any remaining valences of said carbon linked to oxygen are satisfied solely by hydrogen. Thus, X represents an aldehyde

or carbinol, —CH₂OH, group. The four compounds produced by the process of this invention from the 1,1-dimethoxy ethers of n-alkanes of two to three carbon atoms are 2-methoxy-1-propanal, 2-methoxy-1-propanol, 2-methoxy-1-butanal and 2-methoxy-1-butanol.

The proportion of carbon monoxide to hydrogen employed can vary within wide limits, but an initial molar ratio of CO:H₂ in the range of 3:1 and 1:3 has been found most satisfactory.

The time necessary to complete this novel carbonylation reaction will vary from 1 to 15 hours or more depending to a large extent on the pressure and temperature. Although the process is operable at pressures as low as 100 atm. or above 1500 atm. in the temperature range of 125–300° C., the best results are obtained with pressures of 800–1500 atm. and temperatures within the range of 150–250° C. Under these preferred conditions, two to ten hours is ordinarily sufficient reaction time.

In general, the amount of catalyst employed can be as low as 0.1% or as high as 20% based on the weight of the 1,1-dimethoxy-n-alkane reactant. The amount necessary depends considerably on the particular cobalt hydrogenation catalyst employed. For example, larger amounts of cobalt carbonyl are used than when operating the process with sintered cobalt oxide or metallic cobalt catalysts which can also be employed. Excellent results are usually achieved with 5 to 20% of the weight of the dimethoxy alkane employed.

It is to be understood that the invention can, in addition to the batch operations illustrated above, be practiced by continuous procedures. If desired, methanol can be employed, but this or any other solvent is not essential for the satisfactory operation of the invention.

The products obtained in accordance with this invention are useful as intermediates for the manufacture of pharmaceuticals and plasticizers, and as solvents for resins.

As many apparently widely different embodiments of this invention may be made without departing from the spirit and scope thereof, it is to be understood that this invention is not limited to the specific embodiments thereof except as defined in the appended claims.

I claim:

1. A process which comprises reacting a 1,1-dimethoxy ether of an n-alkane of two to three carbon atoms with carbon monoxide and hydrogen as the sole reactants at a temperature of 125° to 300° C. under superatmospheric pressure of at least 100 atmospheres and in the presence of a cobalt hydrogenation catalyst as the sole catalytic agent, and separating therefrom a compound having the same number of carbon atoms as said 1,1-dimethoxy ether and selected from the group consisting of the 2-methoxy-1-alkanols and 2-methoxy-1-alkanals.

2. A process as set forth in claim 1 in which said cobalt hydrogenation catalyst is a reduced cobalt oxide catalyst.

3. A process as set forth in claim 1 in which said cobalt hydrogenation catalyst is cobalt carbonyl.

4. A process which comprises reacting 1,1-dimethoxyethane with carbon monoxide and hydrogen as the sole reactants at a temperature of 150° to 250° C. under superatmospheric pressure of from 800 to 1500 atmospheres and in the presence of a cobalt hydrogenation catalyst as the sole catalytic agent, and separating therefrom 2-methoxy-1-propanal.

5. A process which comprises reacting 1,1-dimethoxypropane with carbon monoxide and hydrogen as the sole reactants at a temperature of 150° to 250° C. under superatmospheric pressure of from 800 to 1500 atmospheres and in the presence of a cobalt hydrogenation catalyst as the sole catalytic agent, and separating therefrom 2-methoxy-1-butanal.

JOSEPH D. C. WILSON, II.

REFERENCES CITED

The following references are of record in the file of this patent:

UNITED STATES PATENTS

| Number | Name | Date |
|---|---|---|
| 2,170,854 | Drake | Aug. 29, 1939 |
| 2,286,034 | Gresham | June 9, 1942 |
| 2,288,211 | Schultz | June 30, 1942 |